(12) United States Patent
Garrett et al.

(10) Patent No.: US 8,933,191 B1
(45) Date of Patent: Jan. 13, 2015

(54) METHOD FOR SYNTHESIZING HIGH MOLECULAR WEIGHT NATURAL OIL POLYOLS

(76) Inventors: Thomas M. Garrett, Corona, CA (US); Stuart L. Watson, Midlothian, VA (US); Xian Xian Du, Pittsburg, KS (US)

( * ) Notice: Subject to any disclaimer, the term of this patent is extended or adjusted under 35 U.S.C. 154(b) by 259 days.

(21) Appl. No.: 13/068,588

(22) Filed: May 16, 2011

Related U.S. Application Data

(60) Provisional application No. 61/395,919, filed on May 19, 2010.

(51) Int. Cl.
*C08G 65/28* (2006.01)
*C08G 65/332* (2006.01)
*C08G 65/26* (2006.01)
*C08G 18/50* (2006.01)
*C08G 18/48* (2006.01)

(52) U.S. Cl.
CPC ........ *C08G 65/2624* (2013.01); *C08G 65/2654* (2013.01); *C08G 65/3322* (2013.01); *C08G 18/4891* (2013.01); *C08G 17/4829* (2013.01)
USPC ................. 528/421; 528/77; 528/78

(58) Field of Classification Search
USPC ........................................................ 528/421
See application file for complete search history.

(56) References Cited

U.S. PATENT DOCUMENTS

| | | | |
|---|---|---|---|
| 2,882,249 A | 4/1959 | Posnansky | |
| 3,485,779 A | 12/1969 | Gast et al. | |
| 4,025,477 A | 5/1977 | Borden et al. | |
| 4,094,838 A | 6/1978 | Schneider et al. | |
| 4,174,329 A | 11/1979 | Bell et al. | |
| 4,508,853 A | 4/1985 | Kluth et al. | |
| 4,551,517 A | 11/1985 | Herold et al. | |
| 4,737,160 A * | 4/1988 | Efner .............................. | 44/332 |
| 4,742,087 A | 5/1988 | Kluth et al. | |
| 4,886,893 A | 12/1989 | Meffert et al. | |
| 5,266,714 A | 11/1993 | Stoll et al. | |
| 5,302,626 A | 4/1994 | Hoefer et al. | |
| 5,476,969 A | 12/1995 | Hinz et al. | |
| 5,576,275 A * | 11/1996 | Moxey .......................... | 508/562 |
| 6,107,433 A | 8/2000 | Petrovic et al. | |
| 6,121,398 A | 9/2000 | Wool et al. | |
| 6,180,686 B1 | 1/2001 | Kurth | |
| 6,433,121 B1 | 8/2002 | Petrovic et al. | |
| 6,433,125 B1 | 8/2002 | Gruetzmacher et al. | |
| 6,573,354 B1 | 6/2003 | Petrovic et al. | |
| 6,686,435 B1 | 2/2004 | Petrovic et al. | |
| 6,762,274 B2 | 7/2004 | Waddington et al. | |
| 6,891,053 B2 | 5/2005 | Chasar et al. | |
| 6,924,321 B2 | 8/2005 | Casati et al. | |
| 2001/0020345 A1* | 9/2001 | Haji et al. ........................ | 44/391 |
| 2006/0041157 A1 | 2/2006 | Petrovic et al. | |

OTHER PUBLICATIONS

Myers (Surfactant Science and Technology, Third Edition, 2006, John Wiley and Sons, pp. 33, 39, 40).* de Kraker, J.W. ; Schurink, M.; Franssen, M.C.R. ; Konig, W. A; de Groot, A.; and Bouwmeester, H.J.. "Hydroxylation of Sesquiterpenes by Enzymes From Chicory (*Cichorium intybus* L.) Roots." *Tetrahedron,* 59(2003), pp. 409-418.

Cirino, P.C. and Arnold, F.H.. "Regioselectivity and Activity of Cytochrome P450 BM-3 and Mutant F87A in Reactions Driven by Hydrogen Peroxide." *Advance Synthetics Catalog* 344, No. 9(2002), pp. 932-937.

Groves, J.T. and Viski, P. . "Asymmetric Hydroxylation by a Chiral Iron Porphyrin." *Journal of American Chemistry Society* 111(1989), pp. 8537-8538.

Balandrian, M. F.; Klocke, J.A.; Wurtele, E.S. ; Bollinger, W.H.. "Natural Plant Chemicals: Sources of Industrial and Medicinal Materials." *Science,* 228(1985), pp. 1154-1160.

Findly, T.W.; Swern, D. and Scanlan, J.T.. "Epoxidation of Unsaturated Fatty Materials with Peracetic Acid in Glacial Acetic Acid Solution." *Journal American Chemistry Society,* vol. 67(1945), pp. 412-414.

Gast, L.E., et al. "Polyesteramides from linseed and soybean oils for protective coatings: Diisocyanate-modified polymers." Journal of the American Oil Chemists' Society, vol. 46, No. 7, Jul. 1969. Web. Jul. 8, 2009.

* cited by examiner

*Primary Examiner* — Randy Gulakowski
*Assistant Examiner* — Rachel Kahn
(74) *Attorney, Agent, or Firm* — John C. McMahon

(57) ABSTRACT

New methods of synthesizing new types of plant derived high molecular weight polyols are provided.

2 Claims, No Drawings

METHOD FOR SYNTHESIZING HIGH MOLECULAR WEIGHT NATURAL OIL POLYOLS

CROSS-REFERENCE TO RELATED APPLICATIONS

This application claims the benefit of U.S. Provisional Patent Application Ser. No. 61/395,919, filed May 19, 2010 and incorporated by reference herein.

BACKGROUND OF THE INVENTION

The present application relates to methods of conversion of plant oils into high molecular weight natural plant oil polyols that can be used as raw materials in the manufacture of polyurethanes.

The manufacture of polyurethanes from polyisocyanates requires readily available coreactants. These coreactant materials are known in the art as polyols. Polyols may be defined as reactive substances, usually liquids, that contain at least two isocyanate-reacting groups attached to a single molecule. Such isocyanate reacting groups (hydroxyl radicals) are also known as "active hydrogen" groups as they typically give a hydrogen atom to the isocyanate nitrogen to form a urethane. For example, at a base level, an alcohol includes an active hydrogen and reacts with isocyanate to form a compound as shown below:

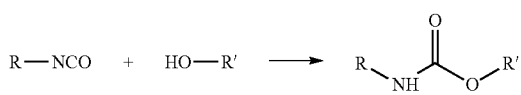

Billions of pounds of polyols are used each year to manufacture polyurethanes. Most of these polyols are polyether polyols derived from fossil fuels, typically polyethylene oxide or polypropylene oxide based polyols. As the price of oil has increased, so has the price of polyether polyols. Therefore, it has become more desirable to explore alternative sources of polyols, including agriculturally derived products such as plant oils.

Plant oils are primary metabolites of many higher plants that are economically important as sources of food and industrial oils. Chemically, plant oils are triglycerides of mixes of fatty acids, which may be the same fatty acid or different fatty acids. Typically, plant oils contain some unsaturated fatty acids. Soybean oil, for example, contains about 54 wt. % linoleic acid, 23 wt. % oleic acid, 10 wt. % palmitic acid, 8 wt. % linolenic acid and 5 wt. % stearic acid. On average, soybean oil contains 4.65 sites of unsaturation (olefin groups, carbon-carbon double bonds) per molecule. If active hydrogen functional groups, such as alcohols, are introduced into the molecule of plant oil, the product can be used as a polyol to make polyurethane.

Many plant oils, such as corn oil, soybean oil, rapeseed oil, sunflower oil, peanut oil, safflower oil, olive oil, and cotton seed oil exist in abundant supply. This abundance may yield low cost polyols, if the plant oils could be functionalized with active hydrogen groups, such as alcohols, without the problems normally inherent in the epoxide synthetic pathway currently used in the production of most plant polyols. For example, almost all of the commercially available polyols made from soybean oil are manufactured in a two step process beginning with the epoxidation of soybean oil. Such process is well known in the art, and may be shown as follows:

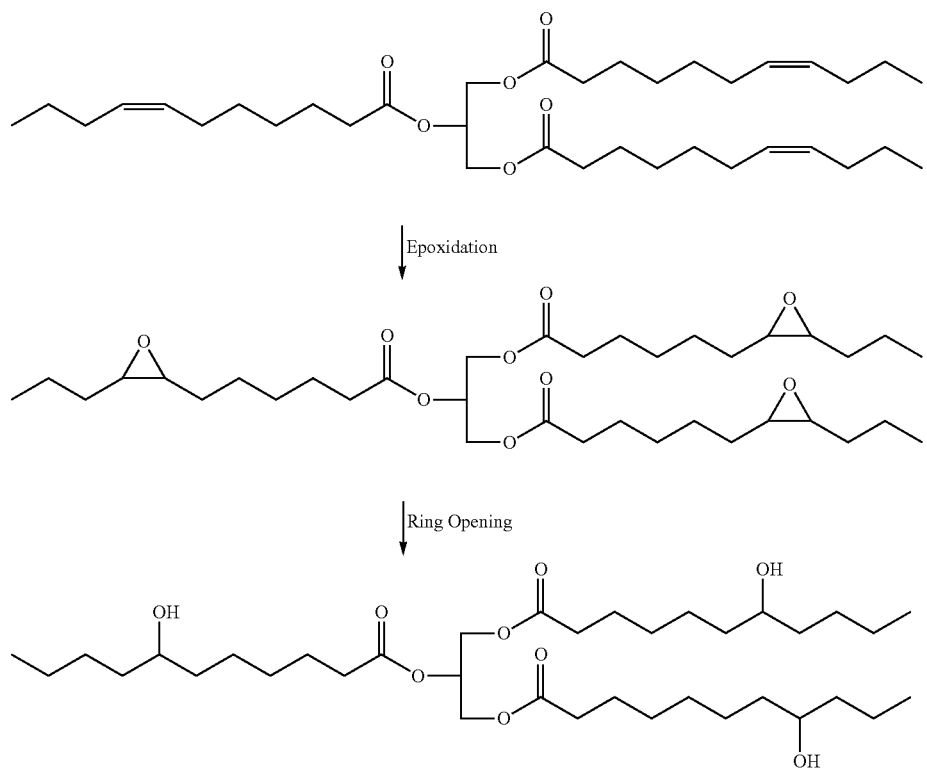

In the above-identified pathway, hydroxyl groups are introduced onto the molecule of soybean oil in the second process step by opening the oxirane of epoxidized soybean oil to form soy polyol. This may be accomplished in a variety of ways. For example, U.S. Pat. No. 2,882,249 describes the soy polyol formed by ring opening epoxidized soybean oil with ricinoleic acid. U.S. Pat. No. 4,025,477 describes the soy polyol obtained by ring opening epoxidized soybean oil with acrylic acid. U.S. Pat. Nos. 5,266,714 and 5,302,626 describe soy polyols obtained by ring opening epoxidized soybean oil with carboxylic acids. U.S. Pat. No. 6,891,053 describes the soy polyol obtained by ring opening epoxidized soybean oil with acid leached clay. U.S. Pat. Nos. 4,508,853 and 4,742,087 describe the soy polyol obtained by ring opening epoxidized soybean oil with alcohols. U.S. Pat. Nos. 6,433,125 and 4,551,517 describe soy polyols obtained by ring opening epoxidized soybean oil with higher alcohols. U.S. Pat. No. 4,886,893 describes the soy polyol obtained by ring opening epoxidized soybean oil with polyfunctional alcohols. U.S. Pat. Nos. 6,107,433, 6,433,121, 6,573,354 and 6,686,435 describe the soy polyols obtained by ring opening epoxidized soybean oil with a mixture of water, alcohol and fluoroboric acid.

Epoxidized soybean oils used to manufacture soy polyols typically have epoxide numbers of from about 4.8 to about 7.2. If the epoxide number of epoxidized soybean oil is too low, the hydroxylation reaction will give a soy polyol that contains an undesirable concentration of by-products having zero and mono hydroxy group molecules. Soy polyol containing zero and mono hydroxyl group molecules result in polyurethanes with poor physical properties. If the epoxide number of the epoxidized soybean oil is too high, the limit market acceptance. Furthermore, such poor properties may limit the overall percentage in which such materials are added to polyurethane formulations. For many uses, preferably, a plant polyol reactant would be a low cost, low viscosity and light colored raw material comparable to certain materials derived from fossil fuels. However, because of the problems inherent in opening the epoxide ring of epoxidized plant oils, such as epoxidized soybean oil, such physical properties are not possible with the currently available technology.

It is noted that it is known in the art to hydroxylate hydrocarbons by biological methods. However, to date, known processes have proven uneconomical. Also, some plant oils can be used as polyols without modification. For example, castor oil contains on average about 2.7 hydroxyl groups per molecule. However, the supply of castor oil is limited and properties of polyurethanes made from such polyols (such as resilience) are not equal to those of fossil fuel derived materials.

Certain polyols may be derived from plant sources. For example polytetramethylene glycol (PTMEG) is derived from polymerizing tetrahydrofuran (THF) from corn. Such polyols yield polyurethanes with excellent physical properties and are thus superior raw materials. However, to date, the high cost of producing such polyols has resulted in limited market acceptance.

It is noted that Gast et al., U.S. Pat. No. 3,485,779 (hereafter Gast) discloses reactions of hydroxylamines with triglycerides. Specifically, Gast discloses that linseed and soybean N,N-bis-hydroxyalkyl fatty amides can be obtained by a strong base sodium methoxide catalyzed aminolysis of linseed oil and soybean oil. Such a reaction may be set forth as follows:

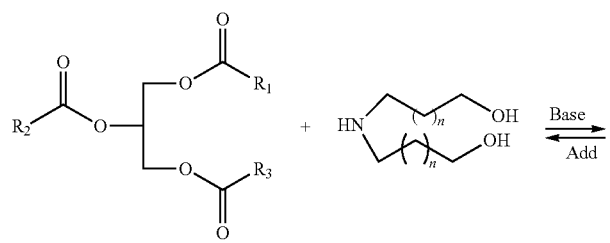 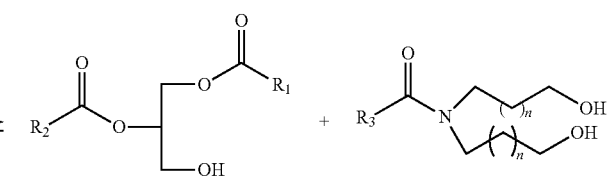

hydroxylation reaction will produce a soy polyol product that contains an undesirably large concentration of by-product having intramolecular cross-linked molecules. High concentrations of by-products containing intramolecular cross-linking unacceptably increases the viscosity of the soy polyols as well as detrimentally affecting the physical properties of the polyurethane products. It is known in the art that ring opening, for example, via hydroxylation of epoxidized plant oils, results in a variety of complex by-products, including, but not limited to intra-molecular cross-linked by-products, intermolecular cross-linked by-products, hydrolysis by-products and alcohol exchange by-products. Furthermore, even the expected or planned products of epoxidized plant oils may be poor reactors, such as secondary hydroxyl groups in the middle of fatty acid chains, which may be high in stearic hindrance.

Currently, manufacturers seeking to use plant oil polyols, such as soybean oil-derived polyols, to produce polyurethane, typically must choose between inexpensive, high viscosity raw materials that are dark in color or, alternatively, expensive, low viscosity and lighter colored materials. Products from both materials may have poor physical properties that Schneider et al., U.S. Pat. No. 4,094,838 discloses soybean N,N,-bis-hydroxy ethyl fatty amide that can be used to make water-dispersible polyurethane coatings as a small molecule polyol of polyurethane resin. Schneider teaches diethanolamine as a preferred amidating agent in a base catalyzed aminolysis. The preferred catalyst being sodium methoxide.

SUMMARY OF THE INVENTION

The present invention provides new methods for plant oil polyol manufacture.

In an embodiment of the invention, a process of producing a plant oil polyol is provided, including the steps of: forming a mixture including a mono-imine, polypropylene oxide and a catalyst; reacting the mixture at a temperature of from about room temperature to about 50° C.; refluxing the reacted mixture in the presence of water; adding a quantity of plant oil to the refluxed mixture; and reacting the resulting mixture at a temperature of from about 82° C. to about 125° C. for a period of time, so as to form a plant oil based polyol. In a further embodiment, the catalyst is boron trifluoride diethyl etherate. In a further embodiment, the plant oil based polyol is selected from the group consisting of a corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol, tung oil polyol and combinations thereof.

In another embodiment of the invention, a process of producing a plant oil polyol is provided, including the steps of: reacting a mixture including dietheylene triamine and a plant oil at a temperature of from about 82° C. to about 125° C. for a period of time, so as to form an intermediate mixture; and reacting the intermediate mixture with propylene oxide and a catalyst at a temperature of about 125° C. for a period of time, so as to form plant oil based polyol with a molecular weight greater than about 1000. In a further embodiment, the catalyst is boron trifluoride diethyl etherate. In a further embodiment, the plant oil based polyol is selected from the group consisting of a corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol, tung oil polyol and combinations thereof. In a further embodiment, the plant oil based polyol is a soybean oil polyol having a molecular weight of at least 1500. In a further embodiment, the a molecular weight of the soybean oil polyol is at least 2000. In a still further embodiment of the molecular weight of the soybean oil polyol is at least 3000. In another embodiment of the invention, a high molecular weight plant oil based polyol with a molecular weight between about 1000 and about 3000 is provided. In a further embodiment, the plant oil based polyol is a soybean oil based polyol.

In a further embodiment of the invention, a process of producing a plant oil polyol is provided, including the steps of propoxylating an imine in the presence of a catalyst to form a first reaction product; and coupling the first reaction product with a natural plant oil to form a natural plant oil-based polyol. In a further embodiment, the natural plant oil is selected from the group consisting of a corn oil, soybean oil, rapeseed oil, sunflower oil, sesame seed oil, peanut oil, safflower oil, olive oil, cotton seed oil, linseed oil, walnut oil, tung oil and combinations thereof. In a further embodiment, the catalyst is boron trifluoride diethyl etherate. In a further embodiment, the imine is propoxylated at a temperature of from about room temperature to about 50° C. In a further embodiment, the first reaction product is coupled with the natural plant oil at a temperature of from about 82° C. to about 125° C.

In another embodiment of the invention, the natural plant oil polyol formed by propoxylating an imine in the presence of a catalyst to form a first reaction product, and coupling the first reaction product with a natural plant oil to form a natural plant oil-based polyol has a molecular weight between about 1000 and about 3000 is provided. In a further embodiment, the natural plant oil based polyol is a soybean oil based polyol.

In yet another embodiment of the invention, a process of producing a plant oil polyol is provided, including the steps of coupling a natural plant oil with diethylenetriamine to form a plant oil intermediate compound; and propoxylating plant oil intermediate compound in the presence of a catalyst to form a natural plant oil-based polyol. In a further embodiment, the natural plant oil is selected from the group consisting of a corn oil, soybean oil, rapeseed oil, sunflower oil, sesame seed oil, peanut oil, safflower oil, olive oil, cotton seed oil, linseed oil, walnut oil, tung oil and combinations thereof. In a further embodiment, the catalyst is boron trifluoride diethyl etherate.

In a further embodiment, the natural plant oil is coupled with diethylenetriamine at a temperature of from about 82° C. to about 125° C. In another embodiment, the plant oil intermediate compound is propoxylated at a temperature of from about room temperature to about 50° C.

In another embodiment of the invention, a high molecular weight plant oil based polyol with a molecular weight between about 1000 and about 3000 formed by coupling a natural plant oil with diethylenetriamine to form a plant oil intermediate compound; and propoxylating plant oil intermediate compound in the presence of a catalyst is provided. In a further embodiment, the natural plant oil based polyol is a soybean oil based polyol.

In another embodiment of the invention, a process of producing a high molecular weight plant oil polyol is provided, including the steps of propoxylating an imine in the presence of a catalyst; and coupling a natural plant oil with an amine; wherein a natural oil polyol having a molecular weight between about 1000 and about 3000 is formed.

Not all objects apply to all embodiments or claims. It is desired for the present invention to provide new methods of synthesizing renewable plant oil based polyols, so as to produce a higher molecular weight polyol that subsequently can be used for the synthesis of bio-based or plant oil based polyurethanes. Furthermore, it is desired for the present invention to provide low cost bio-based polyols with increased reactivity, lower color and less steric hindrance than other polyols.

Advantages of this invention will become apparent from the following description that sets forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention.

It is believed the chemistry disclosed in the present application can be applied to synthetic oils, fossil fuel and derived oils, and oils from genetically engineered plants, as well as naturally occurring plant oils and blends of any of the above oils, as long as such oils include carbon-carbon double bonds on which to carry out the reaction. Also, homologue derivatives of plant polyols according to the invention are possible. For example, polyols of the invention may be ethoxylated or propoxylated to further resemble fossil fuel polyols.

Plant oil based polyols, or natural oil or plant oil polyols having a high molecular weight and a low hydroxyl value or number can be synthesized according to the new methods disclosed herein. Preferably, the molecular weight of the high molecular weight polyol is greater than about 800, and more preferably in a range of about 1,000 to about 20,000, and the hydroxyl value (OHV) is 150 or less. In some embodiments, the plant oil polyol has a molecular weight of about 1000, 1500, 2000, 2500, 3000, including ranges there between or more.

In a first embodiment, a process of producing a plant oil polyol according to Scheme I, below, is provided, so as to form a plant oil based polyol.

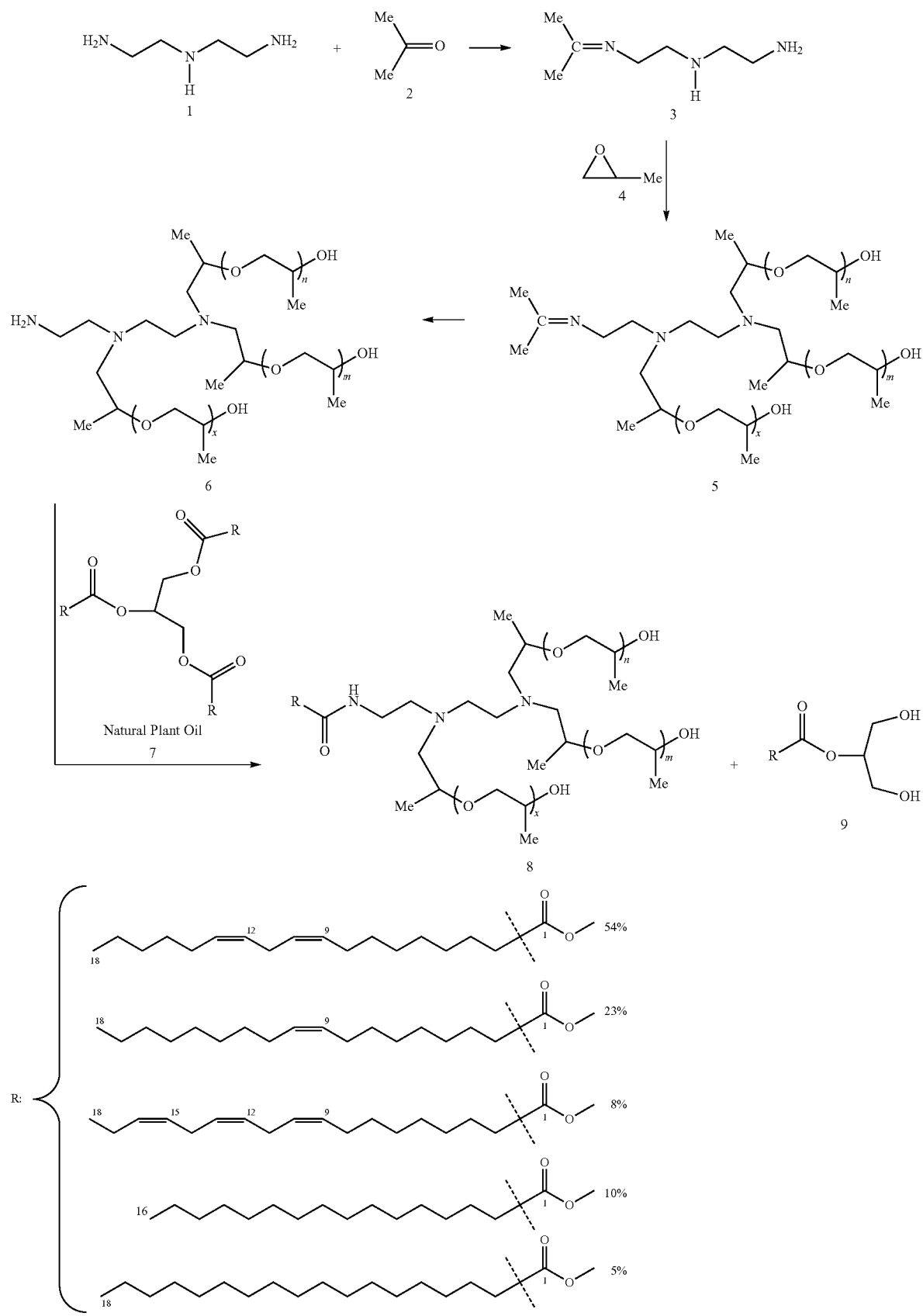

A mono-imine 3 is prepared for use in certain embodiments. In some embodiments, in a first step, a mono-imine 3 is synthesized. For example, according to scheme I, diethylamine 1 and acetone 2 are mixed together with stirring, for a period of time. For example, the diethylamine 1 and acetone 2 may be mixed together at about room temperature for a period of about 24 hours to about 48 hours, or longer. In some circumstances, the mixture of diethylamine 1 and acetone 2 includes no catalyst, and is then heated at a temperature of about 41° C. for an additional period of time, such as but not limited to, about 24 hours to about 48 hours. Then, the reacted mixture is dried, such as over sodium sulfate, so as to produce an amount of the mono-imine 3.

In other embodiments, the mono-imine 3 is synthesized by mixing together diethylamine 1, acetone 2 and a catalyst. Suitable catalysts include but are not limited to calcium oxide powder. the mixture is stirred for a period of time, such as about 24 hours to about 48 hours, at about room temperature. Then, the resulting solid material, the mono-imine 3 is filtered from the liquid phase.

In other embodiments, the mono-imine 3 may be purchased, as premade from another source.

Next, according to Scheme I, the mono-imine 3, polypropylene oxide 4 and a catalyst are mixed together, so as to form second reaction mixture. Suitable catalysts include, but are not limited to, boron trifluoride diethyl etherate. This second mixture is reacted at a temperature of from about room temperature to about 50° C., for a period of time. For example, the mixture may be reacted at a temperature of about 24° C., 30° C., 35° C., 40° C., 45° C., 50° C., 55° C., temperatures there between or greater.

In another example, the mixture may be reacted for a period of time of about 12, 24, 23, 48, 72, times in between or more hours. As is understood by one skilled in the art, increased reaction temperatures are associated with reduced reaction times. For example, the mixture may be reacted for about 70 hours at room temperature. In another example, the mixture may be reacted for about 12 hours at a temperature of about 35° C. to about 50° C.

In some embodiments, the mixture is refluxed during the reaction time. In other embodiments, water is added to the mixture, such as after the reaction time, followed by refluxing for a period of time, such as but not limited to about 5, 6, 7, 8, 9, 10, 11, 12, 13, 14, or 15 hours, time in between or longer.

During the second reaction, an intermediate 5 is formed, and then a reaction product 6 is formed. The water and the catalyst are removed from the reaction produce 6, prior to using the reaction product 6 for synthesizing a plant oil based polyol 8 and 9.

A quantity of plant oil 7 is mixed with reaction product 6. Numerous natural plant oils 7 are suitable reagents for the synthesis of the natural plant oil polyols, including but not limited to corn oil, soybean oil, rapeseed oil, sunflower oil, sesame seed oil, peanut oil, safflower oil, olive oil, cotton seed oil, linseed oil, walnut oil, tung oil and combinations thereof. However, soybean oil 7 is preferred.

The mixture of product 6 and plant oil 7 is reacted at a temperature of from about 82° C. to about 125° C. for a period of time, so as to form the plant oil based polyol 8 and 9. In an exemplary embodiment, the mixture is reacted at a temperature of about 70° C., 75° C., 80° C., 85° C., 90° C., 95° C., 100° C., 105° C., 110° C., 115° C., 120° C., 125° C., 130° C. or 135° C., temperatures, in between or more. In another exemplary embodiment, the mixture is reacted for about 8, 10, 12, 18, 24, 36, 48, 72 or 84 hours, times in between or longer.

In some embodiments, the plant oil based polyol products 8 and 9 include, but are not limited to, corn oil polyols, soybean oil polyols, rapeseed oil polyols, sunflower oil polyols, sesame seed oil polyols, peanut oil polyols, safflower oil polyols, olive oil polyols, cotton seed oil polyols, linseed oil polyols, walnut oil polyols, tung oil polyols and combinations thereof.

In a preferred embodiment, the natural plant oil 7 is soybean oil 7, and the polyol products 8 and 9 are soybean oil polyols 8 and 9. Accordingly, the R groups of the soybean oil polyols 8 and 9 include about 54% linoleic acid, about 23% oleic acid, about 8% linolenic acid, about 10% palmitic acid, and about 5% steric acid.

In some embodiments, the polyol products 8 and 9 include a molecular weight of about 1000 or greater. In a further embodiment, the polyol products 8 and 9 include a molecular weight of about 1500, about 2000, about 2500, or about 3000 or greater. In a preferred embodiment, the polyol products 8 and 9 are soybean oil polyols 8 and 9 with a molecular weight of about 1000, about 1500, about 2000, about 2500, or about 3000 or greater.

The soybean oil polyols 8 and 9 are suitable for polyurethane synthesis, such as discussed above.

The following examples of compositions according to the invention are provided for illustration and are not intended to be limiting upon the scope of the claims. Any parts and percentages are by weight of the composition unless otherwise indicated.

EXAMPLE 1

| Component | Amount (gm) |
| --- | --- |
| Diethylenetriamine | 10.32 |
| Acetone | 5.81 |

The above indicated amount of acetone 2 was dissolved in the above indicated amount of diethylenetriamine 1, with stirring. The mixture was stirred at 25° C. for 42 hours. Then, the mixture was stirred at 41° C. for 24 hours. The reacted mixture was dried over magnesium sulfate to produce 14.20 gm of mono-imine 3.

EXAMPLE 2

| Component | Amount (gm) |
| --- | --- |
| Diethylenetriamine | 103.17 |
| Acetone | 58.08 |

The above indicated amount of acetone 2 was dissolved in the above indicated amount of diethylenetriamine 1, with stirring. The reaction mixture was stirred at room temperature for 24 hours. Then the reaction mixture was stirred at 41° C. for 30 hours. The reacted mixture was dried over sodium sulfate to produce 143.10 gm of mono-imine 3.

EXAMPLE 3

| Component | Amount (gm) |
| --- | --- |
| Diethylenetriamine | 10.32 |
| Acetone | 5.81 |
| Calcium oxide powder | 4.00 |

The above indicated amount of acetone 2 was dissolved in the above indicated amount of diethylenetriamine 1, with stirring. The above indicated amount of calcium oxide powder was then added. The reaction mixture was stirred at room temperature for 24 hours. The resulting solid material was filtered from the liquid phase of the reaction mixture to give 14.25 gm of imine 3.

EXAMPLE 4

| Component | Amount (gm) |
| --- | --- |
| Imine | 14.33 |
| Boron trifluoride diethyl etherate | 0.06 |
| Propylene oxide | 23.22 |
| Water | 10.00 |
| Soybean oil | 40.00 |

The above indicated amount of imine 3, from Examples 1, 2 or 3, was mixed with the above indicated amounts of boron trifluoride diethyl etherate and propylene oxide 4, with stirring. The reaction mixture was stirred at room temperature for 70 hours. Then, the above indicated amount of water was added, and the mixture was refluxed for 10 hours, followed by distillation under vacuum, so as to remove the water and the catalyst. The resulting material 6 was mixed with the above indicated amount of soybean oil 7. This reaction mixture was heated at a temperature of from about 82° C. to about 125° C. for 48 hours, so as to give a soy-based polyol 8 and 9.

EXAMPLE 5

| Component | Amount (gm) |
| --- | --- |
| Imine | 14.33 |
| Boron trifluoride diethyl etherate | 0.10 |
| Propylene oxide | 29.04 |
| Water | 20.00 |
| Soybean oil | 40.00 |

The above indicated amount of imine 3, from Examples 1, 2 or 3, was mixed with the above indicated amounts of boron trifluoride diethyl etherate and propylene oxide 4, with stirring. The reaction mixture was stirred at a temperature of from about 35° C. to about 50° C. for 12 hours under a reflux system. Then, the above indicated amount of water was added to reaction mixture, followed by refluxing for 6 hours. Water and catalyst were removed from the reaction mixture by distillation under vacuum. The resulting material 6 was mixed with the above indicated amount of soybean oil 7 at a temperature of from about 82° C. to about 125° C. for 62 hours to produce a soy-based polyol 8 and 9.

EXAMPLE 6

| Component | Amount (gm) |
| --- | --- |
| Imine | 14.33 |
| Boron trifluoride diethyl etherate | 0.50 |
| Propylene oxide | 52.27 |
| Water | 50.00 |
| Soybean oil | 40.00 |

The above indicated amount of imine 3, from Examples 1, 2 or 3, was mixed with the above indicated amounts of boron trifluoride diethyl etherate and propylene oxide 4, with stirring. The reaction mixture was refluxed until the propylene oxide was completely removed. Then, the above indicated amount of water was added, and the reaction mixture was refluxed for 8 hours. When the refluxing was complete, the water and catalyst were removed by distillation under vacuum. The resulting material 6 was mixed with the above indicated amount of soybean oil 7 at a temperature of from about 82° C. to about 125° C. for 78 hours, so as to produce a soy-based polyol 8 and 9.

EXAMPLE 7

| Component | Amount (gm) |
| --- | --- |
| Imine | 14.33 |
| Boron trifluoride diethyl etherate | 0.06 |
| Propylene oxide | 23.22 |
| Water | 10.00 |
| Soybean oil | 60.00 |

The above indicated amount of imine 3, from Examples 1, 2 or 3, was mixed with the above indicated amounts of boron trifluoride diethyl etherate and propylene oxide 4, with stirring. The reaction mixture was refluxed until the propylene oxide was completely removed. Then, the above indicated amount of water was added, and the reaction mixture was refluxed for 10 hours. When the refluxing was complete, the water and catalyst were removed by distillation under vacuum. The resulting material 6 was mixed with the above indicated amount of soybean oil 7 at a temperature of from about 82° C. to about 125° C. for 48 hours, so as to produce a soy-based polyol 8 and 9.

EXAMPLE 8

| Component | Amount (gm) |
| --- | --- |
| Imine | 14.33 |
| Boron trifluoride diethyl etherate | 0.10 |
| Propylene oxide | 29.04 |
| Water | 20.00 |
| Soybean oil | 60.00 |

The above indicated amount of imine 3, from Examples 1, 2 or 3, was mixed with the above indicated amounts of boron trifluoride diethyl etherate and propylene oxide 4, with stirring. The reaction mixture was then refluxed at a temperature of about 35° C. to about 50° C., for a period of about 12 hours under a reflux system. Then, the above indicated amount of water was added and the reaction mixture was refluxed for an additional 6 hours. When the refluxing was complete, the water and catalyst were removed by distillation under vacuum. The resulting material 6 was mixed with the above indicated amount of soybean oil 7 at a temperature of from about 82° C. to about 125° C. for 62 hours, so as to produce a soy-based polyol 8 and 9.

EXAMPLE 9

| Component | Amount (gm) |
| --- | --- |
| Imine | 14.33 |
| Boron trifluoride diethyl etherate | 0.50 |
| Propylene oxide | 52.27 |
| Water | 50.00 |
| Soybean oil | 60.00 |

The above indicated amount of imine 3, from Examples 1, 2 or 3, was mixed with the above indicated amounts of boron trifluoride diethyl etherate and propylene oxide 4, with stirring. The reaction mixture was then refluxed until propylene oxide was removed. Then, the above indicated amount of water was added and the reaction mixture was refluxed for 8 hours. When the refluxing was complete, the water and catalyst were removed by distillation under vacuum. The resulting material 6 was mixed with the above indicated amount of soybean oil 7 at a temperature of from about 82° C. to about 125° C. for 78 hours, so as to produce a soy-based polyol 8 and 9.

EXAMPLE 10

| Component | Amount (gm) |
| --- | --- |
| Imine | 14.33 |
| Boron trifluoride diethyl etherate | 0.06 |
| Propylene oxide | 23.22 |
| Water | 10.00 |
| Soybean oil | 80.00 |

The above indicated amount of imine 3, from Examples 1, 2 or 3, was mixed with the above indicated amounts of boron trifluoride diethyl etherate and propylene oxide 4, with stirring at room temperature for about 70 hours. Then, the above indicated amount of water was added and the reaction mixture was refluxed for 10 hours. The water and catalyst were removed by distillation under vacuum. The resulting material 6 was mixed with the above indicated amount of soybean oil 7 at a temperature of from about 82° C. to about 125° C. for 48 hours, so as to produce a soy-based polyol 8 and 9.

EXAMPLE 11

| Component | Amount (gm) |
| --- | --- |
| Imine | 14.33 |
| Boron trifluoride diethyl etherate | 0.10 |
| Propylene oxide | 29.04 |
| Water | 20.00 |
| Soybean oil | 80.00 |

The above indicated amount of imine 3, from Examples 1, 2 or 3, was mixed with the above indicated amounts of boron trifluoride diethyl etherate, propylene oxide 4 and water was refluxed at a temperature of between about 35° C. and about 50° C. for a period of about 12 hours. Then, the mixture was distilled under vacuum, so as to remove the water and the catalyst. The resulting material 6 was mixed with the above indicated amount of soybean oil 7 at a temperature of from about 82° C. to about 125° C. for 62 hours, so as to produce a soy-based polyol 8 and 9.

EXAMPLE 12

| Component | Amount (gm) |
| --- | --- |
| Imine | 14.33 |
| Boron trifluoride diethyl etherate | 0.50 |
| Propylene oxide | 52.27 |
| Water | 50.00 |
| Soybean oil | 80.00 |

The above indicated amount of imine 3, from Examples 1, 2 or 3, was mixed with the above indicated amounts of boron trifluoride diethyl etherate and propylene oxide 4 was refluxed until the propylene oxide was completely removed. Then, the above indicated amount of water was added and the mixture was refluxed for a period of about 8 hours. The refluxed mixture was distilled under vacuum, so as to remove the water and the catalyst. The resulting material 6 was mixed with the above indicated amount of soybean oil 7 at a temperature of from about 82° C. to about 125° C. for 78 hours, so as to produce a soy-based polyol 8 and 9.

In a second embodiment, a process of producing a plant oil polyol according to scheme II, below, is provided.

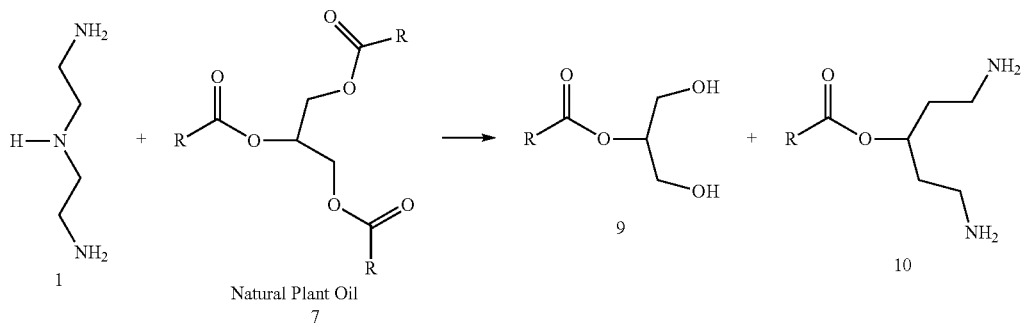

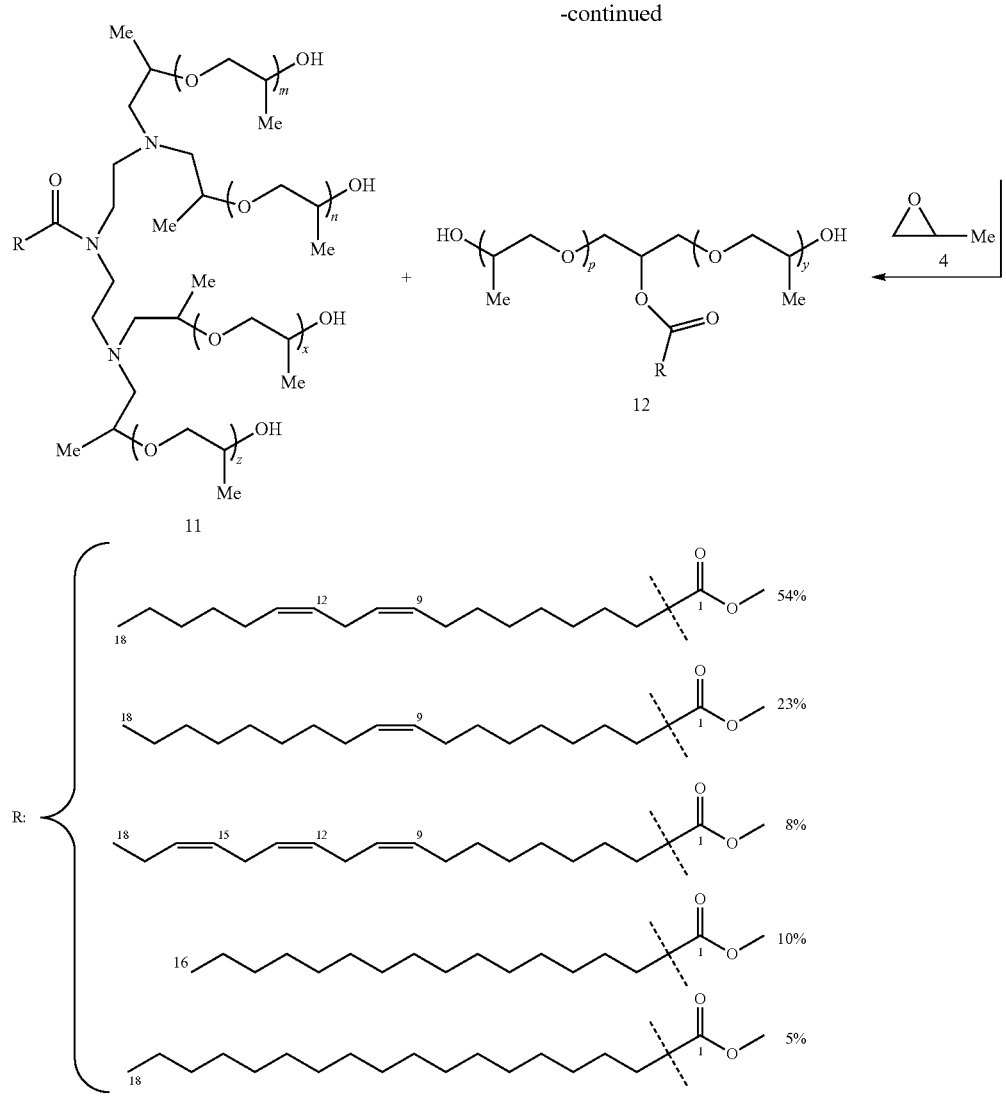

In a first step in accordance with scheme II, a quantity of dietheylene triamine 1 and a quantity of plant oil 7 are stirred for a period of time at a temperature of from about 82° C. to about 125° C., so as to form a mixture of intermediate compounds 9 and 10. For example, the dietheylene triamine 1 is mixed with at least one plant oil 7 selected from the group consisting of corn oil, soybean oil, rapeseed oil, sunflower oil, sesame seed oil, peanut oil, safflower oil, olive oil, cotton seed oil, linseed oil, walnut oil, tung oil and combinations thereof. In a further example, the period of time is from about 8, 10, 12, 14, 16, 18, 20, 22, 24, 26, 28, 30, 32, 34 or 36 hours, times in between or longer.

The mixture of intermediate compounds 9 and 10 is cooled to a temperature of from about room temperature to about 45° C. In some embodiments, the mixture is cooled to a temperature of about 35° C.

Then a quantity of each of propylene oxide 4 and a catalyst are added with stirring. Suitable catalysts include but are not limited to boron trifluoride diethyl etherate, 1,4,7,10,13,16-hexaoxacyclooctadecane (18-crown-6) with potassium hydroxide. The intermediate compounds 9 and 10, propylene oxide 4 and catalyst are refluxed until the propylene oxide 4, followed by stirring the mixture at a temperature of about 125° C., under vacuum, for about 30 minutes, so as to form a plant oil based polyol 11 and 12, with a molecular weight greater than about 1000.

In some embodiments, the pH of the reaction mixture is adjusted by addition of an acid or a base, such as is known in the art. For example, in some embodiments, the pH is adjusted by adding phosphoric acid.

In some embodiments, the plant oil based polyol 11 and 12 is a corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol, tung oil polyol and combinations thereof. However, soybean oil polyols 11 and 12 are preferred.

In a preferred embodiment, the natural plant oil 7 is soybean oil 7, and the polyol products 10 and 12 are soybean oil polyols 10 and 12. Accordingly, the R groups of the soybean oil polyols 10 and 12 include about 54% linoleic acid, about 23% oleic acid, about 8% linolenic acid, about 10% palmitic acid, and about 5% steric acid.

In some embodiments, the plant oil based polyol 11 and 12 includes a molecular weight of about 1500, 2000, 2500 or 3000 weights in between or more. In preferred embodiments, the plant oil based polyol 11 and 12 is a soybean oil polyol 11 and 12 and includes a molecular weight of about 1000, 1500, 2000, 2500 or 3000, weights in between or more.

As discussed above, the plant oil based polyol 11 and 12 find use in synthesizing polyurethanes.

The following examples of compositions according to the invention are provided for illustration and are not intended to be limiting upon the scope of the claims. Any parts and percentages are by weight of the composition unless otherwise indicated.

EXAMPLE 13

| Component | Amount (gm) |
| --- | --- |
| Soybean oil | 90.00 |
| Diethylenetriamine | 20.64 |
| Boron trifluoride diethyl etherate | 1.50 |
| Propylene oxide | 232.32 |

The above indicated amounts of soybean oil 7 and diethylenetriamine 1 were mixed with stirring at a temperature of between about 82° C. and about 110° C. for a period of about 24. The reacted mixture was cooled to a temperature of about 35° C., to produce materials 9 and 10. The above indicated amounts of boron trifluoride diethyl etherate and propylene oxide 4 were added to the mixture of materials 9 and 10. The mixture was then refluxed until the propylene oxide completely was removed. The mixture was then stirred for a period of about 30 minutes at a temperature of about 125° C. under vacuum to produce soybean-based polyols 11 and 12 of approximately 1000 molecular weight.

EXAMPLE 14

| Component | Amount (gm) |
| --- | --- |
| Soybean oil | 90.00 |
| Diethylenetriamine | 20.64 |
| Boron trifluoride diethyl etherate | 2.00 |
| Propylene oxide | 336.86 |

The above indicated amounts of soybean oil 7 and diethylenetriamine 1 were mixed with stirring at a temperature of between about 82° C. and about 110° C. for a period of about 24. The reacted mixture was cooled to a temperature of about 35° C., to give materials 9 and 10. The about indicated amounts of boron trifluoride diethyl etherate and propylene oxide 4 were added to the mixture of materials 9 and 10. The mixture was then refluxed until the propylene oxide completely was removed. The mixture was then stirred for a period of about 30 minutes at a temperature of about 125° C. under vacuum to produce soybean-based polyols 11 and 12 of approximately 1500 molecular weight.

EXAMPLE 15

| Component | Amount (gm) |
| --- | --- |
| Soybean oil | 90.00 |
| Diethylenetriamine | 20.64 |
| Boron trifluoride diethyl etherate | 2.50 |
| Propylene oxide | 487.87 |

The above indicated amounts of soybean oil 7 and diethylenetriamine 1 were mixed with stirring at a temperature of between about 82° C. and about 110° C. for a period of about 24. The reacted mixture was cooled to a temperature of about 35° C., to give materials 9 and 10. The about indicated amounts of boron trifluoride diethyl etherate and propylene oxide 4 were added to the mixture of materials 9 and 10. The mixture was then refluxed until the propylene oxide completely was removed. The mixture was then stirred for a period of about 30 minutes at a temperature of about 125° C. under vacuum to produce soybean-based polyols 11 and 12 of approximately 2000 molecular weight.

EXAMPLE 16

| Component | Amount (gm) |
| --- | --- |
| Soybean oil | 45.00 |
| Diethylenetriamine | 10.32 |
| Potassium hydroxide | 0.30 |
| 18-crown-6 | 0.10 |
| Propylene oxide | 116.16 |
| Phosphoric acid | 0.18 |

The above indicated amounts of soybean oil 7 and diethylenetriamine 1 were mixed with stirring at a temperature of between about 82° C. and about 110° C. for a period of about 24. The reacted mixture was cooled to a temperature of about 35° C., to give materials 9 and 10. The above indicated amounts of potassium hydroxide, 18-crown-6 and propylene oxide 4 were added to the mixture of materials 9 and 10. The mixture was then refluxed until the propylene oxide completely was removed and then cooled to room temperature. The above indicated amount of phosphoric acid was added to the mixture with stirring, to produce soybean-based polyols 11 and 12 of about 1000 molecular weight.

EXAMPLE 17

| Component | Amount (gm) |
| --- | --- |
| Soybean oil | 45.00 |
| Diethylenetriamine | 10.32 |
| Potassium hydroxide | 0.30 |
| 18-crown-6 | 0.10 |
| Propylene oxide | 243.94 |
| Phosphoric acid | 0.18 |

The above indicated amounts of soybean oil 7 and diethylenetriamine 1 were mixed with stirring at a temperature of between about 82° C. and about 110° C. for a period of about 24. The reacted mixture was cooled to a temperature of about 35° C., to give materials 9 and 10. The above indicated amounts of potassium hydroxide, 18-crown-6 and propylene oxide 4 were added to the mixture of materials 9 and 10. The mixture was then refluxed until the propylene oxide completely was removed, and then cooled to room temperature. The above indicated amount of phosphoric acid was added to the mixture with stirring, to produce 2000 molecular weight soybean-based polyols 11 and 12 of about 2000 molecular weight.

EXAMPLE 18

| Component | Amount (gm) |
|---|---|
| Soybean oil | 45.00 |
| Diethylenetriamine | 10.32 |
| Potassium hydroxide | 0.30 |
| 18-crown-6 | 0.10 |
| Propylene oxide | 394.95 |
| Phosphoric acid | 0.18 |

The above indicated amounts of soybean oil 7 and diethylenetriamine 1 were mixed with stirring at a temperature of between about 82° C. and about 110° C. for a period of about 24. The reacted mixture was cooled to a temperature of about 35° C., to give materials 9 and 10. The above indicated amounts of potassium hydroxide, 18-crown-6 and propylene oxide 4 were added to the mixture of materials 9 and 10. The mixture was then refluxed until the propylene oxide completely was removed, and then cooled to room temperature. The above indicated amount of phosphoric acid was added to the mixture with stirring, to produce soybean-based polyols 11 and 12 of about 3000 molecular weight.

The above description discloses several methods and materials of the present invention. Variations of the methods and materials, as well as alterations in the equipment may be utilized in accordance with the invention and the described examples are not intended to limit the scope of the invention. Such variations will become apparent to those skilled in the art from a consideration of this disclosure or practice of the invention disclosed herein. Consequently, it is not intended that this invention be limited to the specific embodiments disclosed herein, but that it cover all variations, modifications and alternatives coming within the true scope and spirit of the invention. It is to be understood that while certain forms of the present invention have been illustrated and described herein, it is not to be limited to the specific forms or configuration of equipment described and shown.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

What is claimed and desired to be secured by Letters Patent is as follows:

1. A process of producing a plant oil polyol comprising the steps of:
    a) forming a first mixture including propylene oxide, boron trifluoride diethyl etherate, and a compound having the structure:

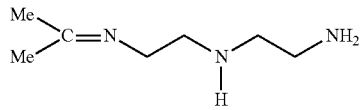

b) reacting the first mixture at a temperature of from 25° C. to 50° C. to form a second mixture;
    c) refluxing the second mixture in the presence of water;
    d) distilling the refluxed second mixture and water of step c) to form a third mixture;
    e) mixing the third mixture with a plant oil to form a fourth mixture; and
    f) reacting the fourth mixture at a temperature in the range from 82° C. to 125° C. for a period of time, so as to form a plant oil based polyol.

2. The process according to claim 1 wherein the plant oil based polyol is selected from the group consisting of a corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol, tung oil polyol and combinations thereof.

* * * * *